US012227972B2

(12) United States Patent
Aerts et al.

(10) Patent No.: US 12,227,972 B2
(45) Date of Patent: Feb. 18, 2025

(54) ANGLE-DETECTING DOOR HANDLE ASSEMBLY (71) Applicant: Tesla, Inc., Palo Alto, CA (US)

(72) Inventors: Joris Aerts, San Francisco, CA (US); Klaus Hofmockel, El Granada, CA (US); Brian Svec, Castro Valley, CA (US)

(73) Assignee: Tesla, Inc., Austin, TX (US)

( * ) Notice: Subject to any disclaimer, the term of this patent is extended or adjusted under 35 U.S.C. 154(b) by 280 days.

(21) Appl. No.: 17/303,676

(22) Filed: Jun. 4, 2021

(65) Prior Publication Data
US 2021/0293060 A1 Sep. 23, 2021

Related U.S. Application Data (62) Division of application No. 15/081,271, filed on Mar. 25, 2016, now abandoned.

(51) Int. Cl.
E05B 81/76 (2014.01)
B60Q 1/26 (2006.01)
E05B 81/54 (2014.01)
E05B 81/64 (2014.01)
E05B 85/10 (2014.01)

(52) U.S. Cl.
CPC ............ E05B 81/76 (2013.01); B60Q 1/2669 (2013.01); E05B 81/54 (2013.01); E05B 81/64 (2013.01)

(58) Field of Classification Search
CPC ..................................................... E05B 85/10
See application file for complete search history.

(56) References Cited

U.S. PATENT DOCUMENTS

| 2,017,244 | A | | 10/1935 | Gudmundsen |
| 5,123,687 | A | | 6/1992 | Pfeiffer et al. |
| 5,305,969 | A | | 4/1994 | Odell et al. |
| 5,632,516 | A | | 5/1997 | Schwab |
| 5,844,470 | A | | 12/1998 | Gamault et al. |
| 5,881,973 | A | * | 3/1999 | Agajanian ................. B64F 5/60 244/129.5 |
| 5,890,384 | A | | 4/1999 | Bartel |

(Continued)

FOREIGN PATENT DOCUMENTS

CN 203835084 U 9/2014
CN 104854289 8/2015

(Continued)

OTHER PUBLICATIONS

International Search Report and Written Opinion; PCT/US17/22730; Jun. 6, 2016; 8 pgs.

(Continued)

Primary Examiner — Carlos Lugo
(74) Attorney, Agent, or Firm — Schwegman Lundberg & Woessner, P.A.

(57) ABSTRACT

An angle-detecting door handle assembly comprises: a handle member; a four-bar link configured to move the handle member between at least retracted and presented positions relative to a door surface; a motor configured to actuate the four-bar link; a rotary sensor configured to detect an angle of the four-bar link throughout actuation and generate a signal corresponding to the detected angle; and a controller configured to control the motor based on the signal from the rotary sensor.

16 Claims, 10 Drawing Sheets (56) References Cited

U.S. PATENT DOCUMENTS

| | | |
|---|---|---|
| 6,062,614 A | 5/2000 | Petzold |
| 6,072,403 A | 6/2000 | Iwasaki et al. |
| 6,094,131 A | 7/2000 | Chen et al. |
| 6,209,612 B1 * | 4/2001 | Schack ................ E05B 65/087 |
| | | 187/335 |
| 6,225,770 B1 | 5/2001 | Heinrich |
| 6,367,124 B1 | 4/2002 | Bella |
| 6,377,005 B1 * | 4/2002 | Zintler .................... E05B 81/64 |
| | | 318/653 |
| 6,429,782 B2 | 8/2002 | Pavatich et al. |
| 6,597,139 B1 | 7/2003 | Klesing |
| 6,598,913 B2 | 7/2003 | Meinke |
| 6,698,262 B2 | 3/2004 | Wittwer |
| 6,843,084 B2 | 1/2005 | Porter |
| 6,974,165 B2 | 12/2005 | Koike |
| 7,445,257 B2 | 11/2008 | Muller et al. |
| 7,621,573 B2 | 11/2009 | Thomas et al. |
| 8,047,583 B2 | 11/2011 | Clausen |
| 8,403,265 B2 | 3/2013 | Gowing et al. |
| 8,433,538 B2 | 4/2013 | Holzmann |
| 8,443,553 B1 | 5/2013 | Polewarczyk et al. |
| 8,482,394 B2 | 7/2013 | Nass |
| 8,552,715 B2 | 10/2013 | Semineth |
| 8,701,353 B2 | 4/2014 | Patel et al. |
| 8,733,815 B2 | 5/2014 | Kwon |
| 8,884,611 B2 | 11/2014 | Hunger |
| 8,833,190 B2 | 12/2014 | Hsu et al. |
| 8,919,047 B2 | 12/2014 | Johnsrud et al. |
| 9,080,352 B2 | 7/2015 | Aerts et al. |
| 9,103,143 B2 | 8/2015 | Wheeler et al. |
| 9,151,089 B2 | 10/2015 | Aerts et al. |
| 9,249,608 B2 | 2/2016 | Lang |
| 2003/0090265 A1 | 5/2003 | Wan et al. |
| 2003/0182863 A1 | 10/2003 | Mejean et al. |
| 2004/0177478 A1 | 9/2004 | Louvel |
| 2004/0195845 A1 | 10/2004 | Chevalier |
| 2007/0126246 A1 | 6/2007 | Suzuki et al. |
| 2008/0021619 A1 | 1/2008 | Steegmann et al. |
| 2008/0061933 A1 | 3/2008 | Ieda et al. |
| 2008/0163555 A1 | 7/2008 | Thomas et al. |
| 2008/0290668 A1 | 11/2008 | Ieda et al. |
| 2008/0314097 A1 | 12/2008 | Rohlfing et al. |
| 2009/0039671 A1 | 2/2009 | Thomas et al. |
| 2009/0243319 A1 | 10/2009 | Browne et al. |
| 2010/0127516 A1 | 5/2010 | Fannon |
| 2011/0018056 A1 | 1/2011 | Takeuchi |
| 2011/0148575 A1 | 6/2011 | Sobecki et al. |
| 2012/0119524 A1 | 5/2012 | Bingle et al. |
| 2013/0076047 A1 | 3/2013 | Wheeler et al. |
| 2013/0079984 A1 | 3/2013 | Aerts et al. |
| 2013/0127185 A1 | 5/2013 | Lang et al. |
| 2013/0147213 A1 | 6/2013 | Muller et al. |
| 2014/0000167 A1 | 1/2014 | Patel et al. |
| 2014/0022811 A1 | 1/2014 | Wheeler et al. |
| 2014/0069015 A1 | 3/2014 | Salter et al. |
| 2015/0008907 A1 | 1/2015 | Janisch |
| 2016/0109264 A1 | 4/2016 | Baumann |
| 2017/0275930 A1 | 9/2017 | Aerts et al. |

FOREIGN PATENT DOCUMENTS

| | | | | |
|---|---|---|---|---|
| CN | 108884691 | | 11/2018 | |
| DE | 3427178 | | 2/1986 | |
| DE | 19731325 | | 1/1999 | |
| DE | 19830878 A1 * | | 1/1999 | ............ E05B 47/00 |
| DE | 19833168 | | 2/2000 | |
| EP | 1442931 A2 * | | 8/2004 | ............... B60Q 1/32 |
| EP | 3433458 | | 1/2019 | |
| FR | 2889553 | | 2/2007 | |
| GB | 45333 | | 9/1936 | |
| GB | 2477085 | | 7/2011 | |
| SE | 521632 | | 11/2003 | |
| WO | 2017165190 | | 9/2017 | |

OTHER PUBLICATIONS

"U.S. Appl. No. 15/081,271, Examiner Interview Summary mailed Jul. 1, 2020", 3 pgs.

"U.S. Appl. No. 15/081,271, Final Office Action mailed Jan. 19, 2021", 10 pgs.

"U.S. Appl. No. 15/081,271, Final Office Action mailed Nov. 8, 2019", 13 pgs.

"U.S. Appl. No. 15/081,271, Non Final Office Action mailed Jun. 9, 2020", 13 pgs.

"U.S. Appl. No. 15/081,271, Non Final Office Action mailed Jun. 19, 2019", 10 pgs.

"U.S. Appl. No. 15/081,271, Response filed Apr. 23, 2019 to Restriction Requirement mailed Feb. 26, 2019", 7 pgs.

"U.S. Appl. No. 15/081,271, Response filed May 7, 2020 to Final Office Action mailed Nov. 8, 2019", 11 pgs.

"U.S. Appl. No. 15/081,271, Response filed Oct. 11, 2019 to Non Final Office Action mailed Jun. 19, 2019", 10 pgs.

"U.S. Appl. No. 15/081,271, Response filed Dec. 9, 2020 to Non Final Office Action mailed Jun. 9, 2020", 15 pgs.

"U.S. Appl. No. 15/081,271, Restriction Requirement mailed Feb. 26, 2019", 6 pgs.

"International Application Serial No. PCT US2017 022730, International Preliminary Report on Patentability mailed Oct. 4, 2018", 7 pgs.

"European Application Serial No. 17770849.2, Extended European Search Report mailed Nov. 8, 2019", 7 pgs.

"European Application Serial No. 17770849.2, Response filed May 22, 2020 to Extended European Search Report mailed Nov. 8, 2019", 38 pgs.

"European Application Serial No. 17770849.2, Communication Pursuant to Article 94(3) EPC mailed Oct. 20, 2020", 5 pgs.

* cited by examiner

ANGLE-DETECTING DOOR HANDLE ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Some approaches have been used for providing moveable handles on vehicle closures such as doors. One approach is to provide one or more force sensors as part of the mechanics of the handle. For example, this approach is described in co-assigned U.S. Pat. Nos. 9,080,352; 9,103,143 and 9,151,089. However, force sensing may not provide the flexibility in operation that may be desired, and the system can be expensive and relatively difficult to assemble.

Another approach is to provide switches as a part of the mechanism in the handle assembly. For example, switches can sense the position of a movable component in the handle mechanism, such as when it travels to the extreme ends of its path of motion. However, when the handle is traveling (or stationary) in between the switch positions the system does not have information on the handle's position. It may therefore be necessary to apply broader parameters to the travel in order to account for significant friction or other unexpected factors that could affect the movement of the handle.

SUMMARY

In a first aspect, an angle-detecting door handle assembly comprises: a handle member; a four-bar link configured to move the handle member between at least retracted and presented positions relative to a door surface; a motor configured to actuate the four-bar link; a rotary sensor configured to detect an angle of the four-bar link throughout actuation and generate a signal corresponding to the detected angle; and a controller configured to control the motor based on the signal from the rotary sensor.

Implementations can include any or all of the following features. The four-bar link comprises a swing arm and a control arm; the swing arm pivoting about a shaft relative to the door surface, wherein the angle is detected by rotation of the shaft. The angle-detecting door handle assembly further comprises a magnet, wherein the rotary sensor detects orientation of poles of the magnet. One of the magnet and the rotary sensor is mounted relative to a carrier of the door handle assembly, and another of the magnet and the rotary sensor is mounted on a separate member attached to the carrier, wherein the separate member is adjustable relative to the carrier to change a gap between the magnet and the rotary sensor. The separate member is adjustable in a single dimension relative to the carrier. One of the separate member and the carrier has at least one elongate slot and wherein another of the separate member and the carrier has at least one datum feature corresponding to the elongate slot. The angle-detecting door handle assembly further comprises one or more oversized fastener openings on one of the separate member and the carrier that accommodates adjustment between them. The rotary sensor comprises a Hall sensor or a magnetoresistive sensor. The controller is configured to stop the motor from actuating the four-bar link upon detecting that the motor actuates the four-bar link to a specific angle. The controller is configured to start or stop the motor upon detecting user actuation of the four-bar link by touching the handle member The angle-detecting door handle assembly further comprises a biasing member acting on the four-bar link to bring the handle member to the retracted position, wherein the motor actuates the four-bar link against bias of the biasing member to bring the handle member to the presented position. The angle-detecting door handle assembly further comprises a mounting member on which the rotary sensor is mounted; and further comprising a light in the handle member, wherein the mounting member serves as a breakout for signals to the motor and to the light. The mounting member comprises a printed circuit board, the door handle assembly further comprising a multi-connector harness that is a sole connector for the door handle assembly. The angle-detecting door handle assembly further comprises a housing that accommodates the rotary sensor and the printed circuit board, the housing having a first cavity for the multi-connector harness at one end, and respective cavities for the motor and the light at an opposite end. The mounting member comprises a lead frame.

In a second aspect, a method performed with regard to an angle-detecting door handle assembly comprises: causing actuation of a four-bar link by a motor, the four-bar link connected to a handle member of the door handle assembly, the handle member initially in a retracted position relative to a door surface; detecting an angle of the four-bar link throughout the actuation; and when the detected angle corresponds to a presented position of the handle member, stopping the actuation of the four-bar link.

Implementations can include any or all of the following features. The method further comprises, in the retracted position, detecting a change in the angle indicating user actuation of the four-bar link by pushing of the handle member, and causing the actuation of the four-bar link in response to the detected change. The method further comprises, in the presented position, detecting a change in the angle indicating user actuation of the four-bar link by pulling of the handle member, and, in response to the detected change, actuating the four-bar link to advance the handle member to a clamped position. The method further comprises reprogramming the angle-detecting door handle assembly so that a different angle corresponds to the presented position of the handle member. The method further comprises also reprogramming the angle-detecting door handle assembly to change an angle corresponding to the retracted position of the handle member, or to change an angle corresponding to a clamped position of the handle member.

DETAILED DESCRIPTION

This document describes examples of systems and techniques for detecting the angle of a movable handle so as to control its operation based on that angle. in some implementations, a moveable handle is installed in a vehicle closure, such as a door, and the handle is configured to be retracted into the body of the closure when not being used and to be extended outside the surface of the door when the handle is ready to use. The angle can be detected using a rotary sensor, such as a Hall sensor or a magnetoresistive sensor, to effectively allow the system to operate the handle in its current state. For example, the angle detection can serve as an input that determines when to stop the motor that drives the handle. As another example, the angle detection can serve to convey a user interaction to the handle controller, such as when the user presses or pulls on the handle, and the controller can then operate the handle motor based on that input.

Some examples herein relate to a closure on a vehicle. However, some implementations can involve closures in other contexts than a vehicle. Also, while a door is sometimes mentioned, this is for illustrative purposes only. Some implementations can involve other closures on a vehicle, including, but not limited to, a lift gate or other trunk closure. Examples of earlier types of vehicle door handles are described in co-owned U.S. Pat. Nos. 9,080,352, 9,103,143 and 9,151,089, the contents of which are incorporated herein by reference.

Figure 1:
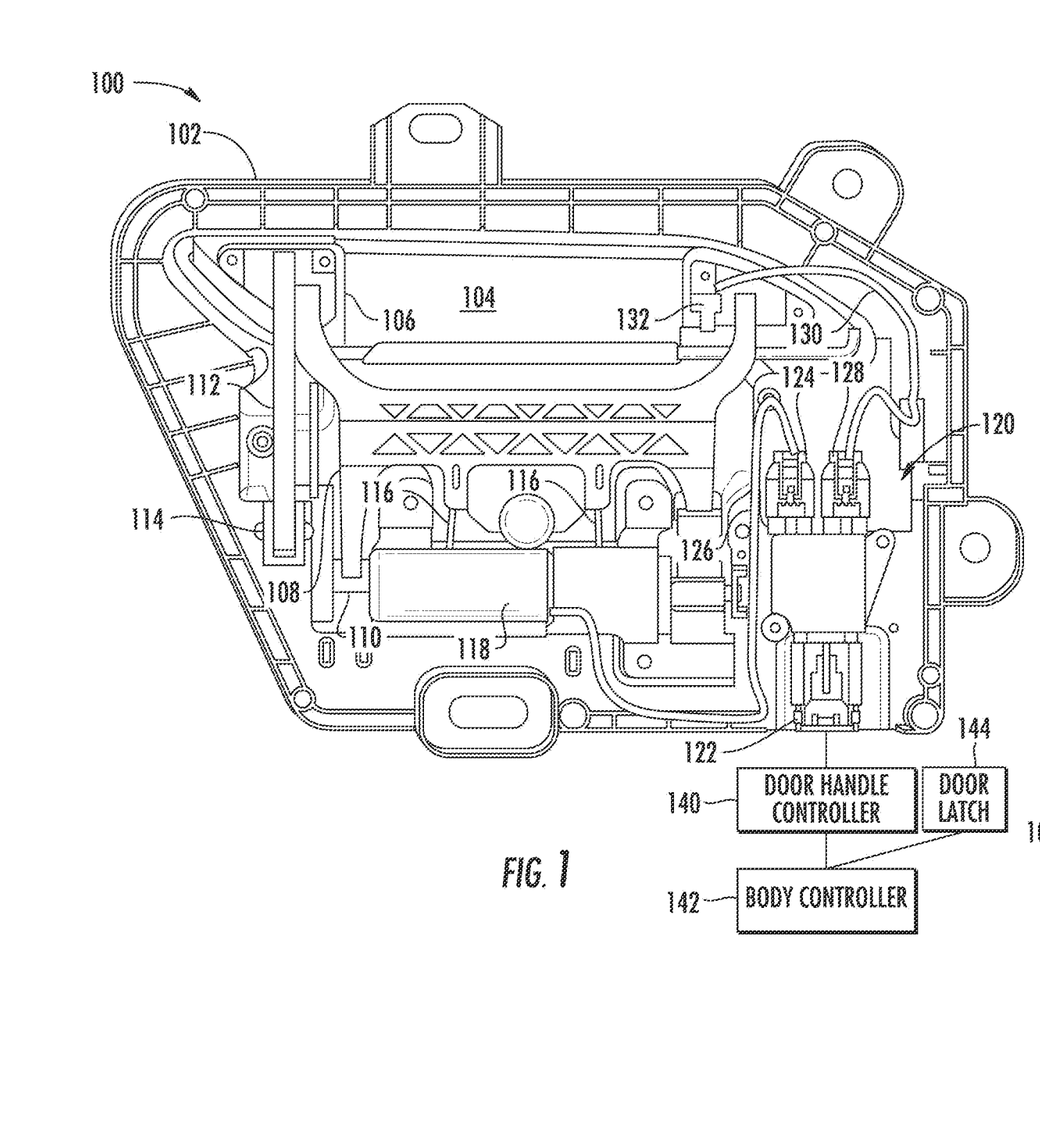
FIG. 1 shows an example of an angle-detecting door handle assembly.

FIG. 1 shows an example of an angle-detecting door handle assembly 100. In some implementations, each door on a vehicle can have a corresponding one of the assembly 100. For example, an assembly on the left side of the vehicle can in some or all respects be a mirror image counterpart of an assembly on the right side. Operations described herein can then be performed on only one of the handles, or they can be performed on ail handles collectively, or combinations thereof. The assembly is here being shown from inside the door looking outward. As such, the part of the door handle that can protrude beyond the outer door panel is not directly visible here.

The assembly here includes a handle assembly tray 102 that holds essentially all components of the assembly. in some implementations, an inner door panel has an opening where the tray 102 is mounted. For example, the tray can be made of a plastic material, such as by a molding process.

While not all of the movable handle portion that is to be grasped by a user is visible in this illustration, a handle base member 104 is shown. For example, the member 104 can have posts 106 extending in an essentially transverse direction at either end thereof. The handle base member 104 is pivotally connected to a swing arm 108 in the handle assembly by way of one or more shafts at the handle member. The swing arm is pivotally connected to the tray 102 by a shaft 110. The handle base member 104 is also pivotally connected to a control arm 112 in the handle assembly by way of one or more shafts at the handle member. The control arm is pivotally connected to the tray 102 by a shaft 114. The handle base member is pivotally connected to the swing arm 108 and the control arm 112, respectively, each of which has its respective pivotal connection to the tray by the shafts 110 and 114. Accordingly, this can form a four-bar link for the handle assembly. In some implementations, the four-bar link can allow the handle base member to remain essentially level while traveling into and out of the door. For example, this can allow the rotational movement of the four-bar link to provide the visual appearance of purely horizontal travel of the movable handle.

The four-bar link can be biased in at least one direction by the handle assembly using one or more biasing elements. Here, springs 116 are shown acting on the swing arm. For example, the biasing element(s) can urge the four-bar link in an inward direction in the door.

The handle assembly includes a motor 118 that is configured for actuating the four-bar link, and thereby the handle member, in one or more directions. in some implementations, the motor is a DC motor that can be caused to rotate in either direction. For example, an H-bridge can be used for driving the motor. The motor can actuate the four-bar link using one or more gears. For example, a paddle gear can be used. The foregoing is an example showing that the spring(s) 116 can act on the four-bar link to bring the handle member to a retracted position, and that the motor 118 can actuate the four-bar link against bias of the biasing member to bring the handle member to a presented position.

The handle assembly includes a sensor assembly 120. This assembly includes an encoder or other rotary sensor that detects the rotational position of one or more aspects of the four-bar link. The sensor output can be provided in form of a signal to one or more controllers for purpose of using such signal to control the operation of one or more components, including the motor. As such, the sensor assembly can also play a role in facilitating such communications to and from various components of the assembly. Here, the sensor assembly includes a door harness cavity 122 that is configured for having a single harness of connectors lead to and from the door handle. For example: this can eliminate the need to have multiple harnesses for the respective functions, such as power supply and control signaling. The sensor assembly includes a motor cavity 124 that by way of a connector 126 extends to the motor 118. The sensor assembly includes an illumination cavity 128 that by way of a connector 130 leads to at least one light 132 in the door handle assembly. In some implementations, the light is incorporated in the handle base member or in the post(s) to that member. For example, one or more LEDs can be used.

The sensor assembly, in addition to providing angle detection, can facilitate passthrough of signals between respective ones of the sensor, the motor, the LED and a remote controller. In some implementations: the harness that connects to the cavity 122 contains respective cables for power supply (e.g., 12V), ground and signaling, to name some examples, and the sensor assembly ensures that the signaling conductor is connected to the sensor, while the motor and LED conductors are coupled to those respective components. One advantage is that the cavity 122 can serve as the single point of connection for the rest of the door and the vehicle to the door handle assembly. As such, the sensor assembly or a part thereof can serve as a breakout for signals to the motor 118 and to the light 132.

Figure 1A:
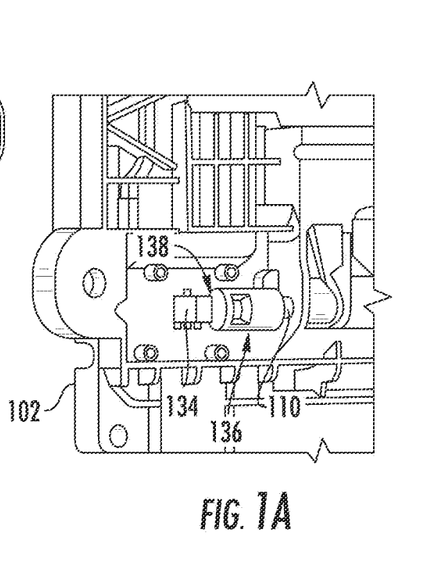
FIG. 1A shows an example of a rotary sensor of the door handle assembly in FIG. 1.

FIG. 1A shows an example of a rotary sensor 134 of the door handle assembly in FIG. 1. The door handle assembly is here shown only in part, and is presented from an opposite direction than in the previous figure. As such, the sensor 134 extends from the sensor assembly 120 (FIG. 1) through an opening in the handle assembly tray 102. In this position, the sensor can detect the movement or position or relative position of a magnet assembly 136. The magnet assembly can include a magnet mounted on the shaft 110 so as to rotate therewith. As such, the magnet can represent the position of the shaft while or after the four-bar link is subjected to rotation. The rotary sensor, which can detect the relative positions of respective poles on the magnet, can therefore detect the angle of the shaft at all times. The rotary sensor can be a non-contact sensor. In some implementations, the sensor is a Hall sensor or a magnetoresistive sensor configured to detect the rotary position of the magnet attached to the rotatable shaft. For example, a gap 138 can be formed between the sensor and the magnet.

Referring again to FIG. 1, the door handle assembly is connected, by the harness, to a door handle controller 140 which in turn is coupled to a body controller 142 for the vehicle. The body controller can be responsible for a variety of functions in the vehicle, including, but not limited to, latching and unlatching the door using a door latch 144. Any suitable processor that executes instructions can be used for the controller(s), such as an integrated circuit provided with firmware instructions.

In this example, the magnet is mounted on the rotatable member (the shaft) and the sensor is stationary (mounted on the tray). In other implementations, the positions can be the opposite, for example such that the magnet is mounted to the tray and the sensor rotates with the four-bar link, thereby detecting the angle of rotation between these components.

Figure 2A:
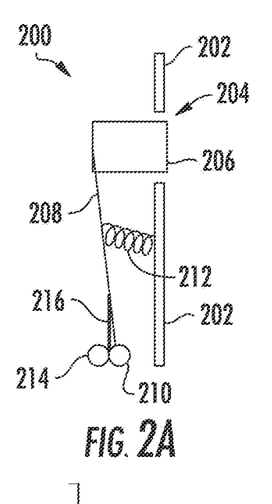
FIGS. 2A-E schematically show examples of operations of an angle-detecting door handle assembly.
Figures 2B, 2C:
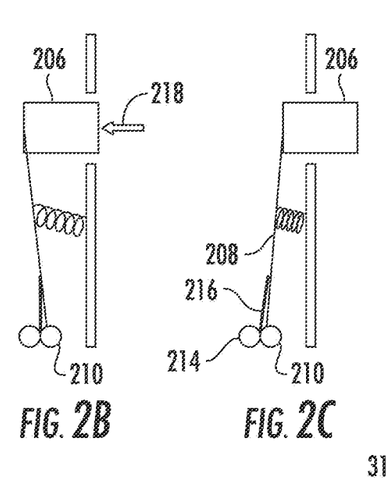
Figures 2D, 2E:
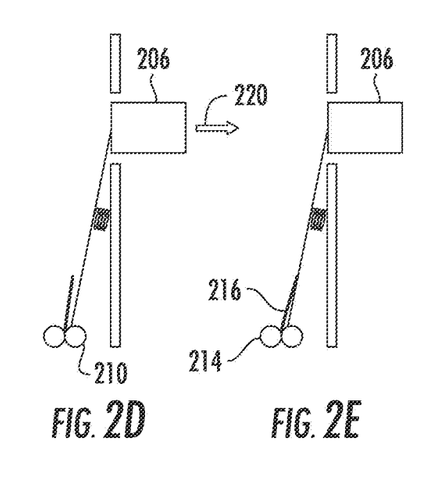
Figure 3:
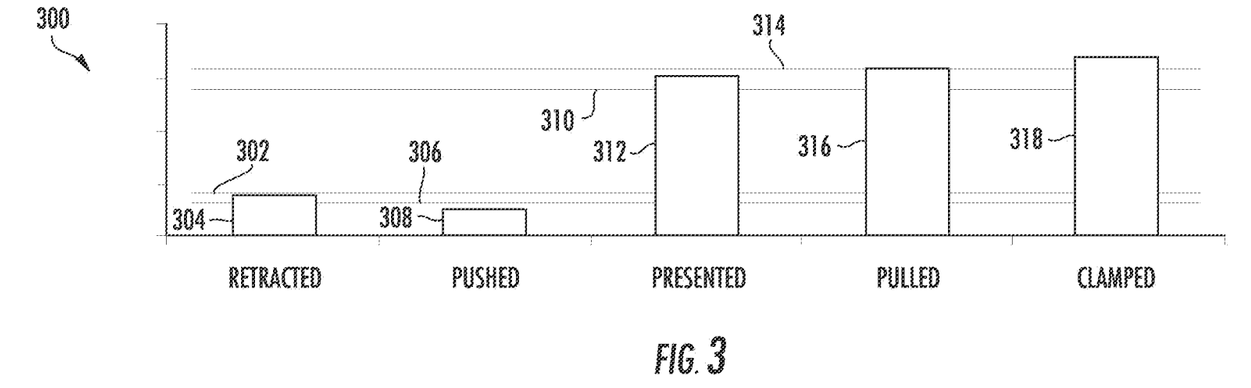
FIG. 3 shows a graph of measured angles that can be used to control an angle-detecting door handle assembly.

FIGS. 2A-E schematically show examples of operations of an angle-detecting door handle assembly 200. FIG. 3 shows a graph 300 of measured angles that can be used to control an angle-detecting door handle assembly. Here, the assembly 200 is arranged in a door of which an outer panel 202 is partially shown. For example, this panel is the skin of the door that faces outward after installation. An opening 204 is formed in the outer panel. For example, this opening allows a door handle 206 of the assembly to be extended outside the door, and to be at least partially retracted inside the door.

The door handle is mounted on a swing arm 208 that can rotate about a pivot point, such as a shaft 210. The handle 206 is pivotally mounted to the swing arm itself as part of a four-bar link that allows essentially horizontal travel of the door handle. For example, the rotational angle of the shaft 210 can be continuously monitored by a controller so as to give the controller information about the position of the door handle. For example, the monitoring can detect the rotational angle many times every second so as to produce an essentially continuous detection of the angle. A spring 212 or other biasing element can be applied to the four-bar link. The biasing element can urge the handle away from the outer panel 202 so as to tend to retract the handle into the door.

A motor shaft 214 is driven by a motor (not shown). For example, the motor 118 (FIG. 1) can be used. The motor shaft 214 here has a paddle gear 216 attached to it so as to rotate with the shaft 214. For example, the paddle gear 216 can actuate the swing arm 208 toward the outer panel 202. FIG. 2A shows the handle assembly in a retracted position.

Referring also to the graph 300, the retracted position can be determined using an angle threshold 302. For example, the threshold angle is specified against a vertical axis in the graph, which axis can have an arbitrary scale. When a detected angle 304 goes below the threshold 302, the handle can be considered in the retracted position. As a result, other operations can be ceased (e.g., motor operation and light illumination) and/or initiated (e.g., door latching).

Operation of the door handle assembly can be triggered in one or more ways. For example, because the angle of the shaft is continuously monitored, it can be registered that a user pushes the handle 206 inward. In FIG. 2B, an arrow 218 schematically represents this user interaction. The user's pressing of the door handle generates a small movement of the handle inward. which can in turn be detected as a change in the angle of the shaft 210 of the four-bar link. For example, this movement can be facilitated by a spring that allows the handle to be pressed somewhat further inward than its retracted position, or the movement can be performed against the compliance of the door handle mechanism.

In the graph 300, the detection of the inward pressing can be determined using an angle threshold 306. For example, when a detected angle 308 goes below the threshold 306, it can be deemed that the handle has been pressed inward. The detection of the change in shaft angle resulting from an inward push of the door handle can trigger one or more operations. In some implementations, this angle detection is interpreted as an input by a user that the handle should be extended. As a result, one or more components in the door handle assembly can be energized. For example, the motor can be actuated to advance the four-bar link so as to extend the handle through the opening in the outer panel. Other functions than motor actuation can be triggered by the detection corresponding to the inward push, including, but not limited to, illumination of one or more lights on the door handle.

In FIG. 2C, the motor has been energized to drive the shaft 214 so that the paddle gear 216 advances the swing arm 208, thereby moving the handle toward an extended position. This motion can be done against the bias of the spring. The angle of the shaft 210 can be monitored throughout this movement. As such, the motor can be operated until the handle reaches a predetermined position (e.g., corresponding to the handle reaching 90% of its fully extended position). Upon that target angle being detected, the motor can be stopped. In the graph 300, an angle threshold 310 can be used for determining when the handle has been presented. For example, an angle 312 can be continuously monitored as the motor is advancing the handle outward, and when the angle crosses the threshold 310, the motor can be turned off. At this point, the handle is extended outside the door to what can be considered a presented position and can be grasped by a person.

Because the angle of the shaft 210 is being monitored in the presented position, a further user interaction with the handle can be registered and can be used to trigger additional functionality. For example, FIG. 2D shows an arrow 220 representing that a user pulls on the door handle 206. That is, when the shaft 210 of the four-bar link rotates past the point of the presented position (e.g., past the point where the handle is 90% presented) this can be interpreted to be a pulling on the door handle by the user's hand. In the graph 300, an angle threshold 314 can be used to determine whether the handle is being pulled. For example, when a monitored angle 316 exceeds the threshold 314, the system can consider this to be a pulling of the door handle beyond its presented position.

In response to this angle detection, one or more operations can be performed. For example, the controller can open a door latch so as to unlatch the door to allow it to be swung open. As another example, the motor can again be energized to advance the door handle further outward. FIG. 2E shows that the motor has actuated the shaft 214 so as to apply the paddle gear 216 against the four-bar link and thereby further extend the handle 206. For example, this can be considered a clamped position (e.g., the handle is now at 100% of its extended travel). This 100% extended travel can help avoid handle movement due to its inertia as the door is moving. In some implementations, the system immediately drives the handle to 100%, and then drives it back to 90% based on a latch status. For example, if the door is closed or ajar the handle goes back to 90% so a new press can be detected. In the graph 300, an angle 318 corresponds to the detected angle when the handle has been moved to its most extended (e.g., clamped) position.

A detected angle can also be used for one or more other purposes. In some implementations, angle monitoring is used for pinch detection or other accident avoidance. For example, when the handle is retracting inward the monitored angle can indicate whether the handle is being impeded by an obstacle. in such situation, the retraction can be interrupted, for example by instead using the motor to maintain the handle in place, or to actuate the handle outward. As another example, when the handle is being presented, the monitored angle can indicate whether the handle is being impeded, and the motor can then be stopped to prevent further extension of the handle.

Figure 4:
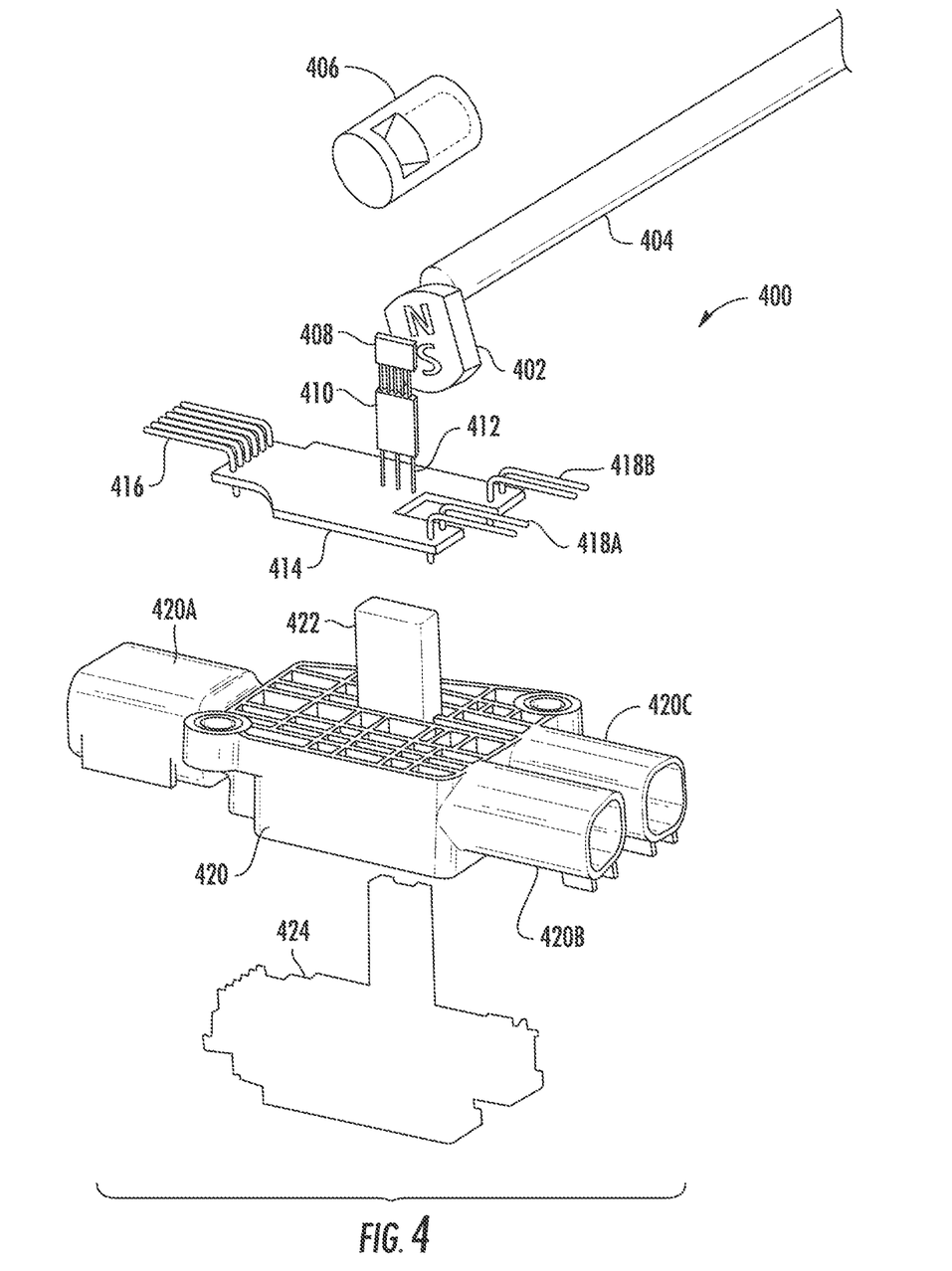
FIG. 4 shows components of an angle-detecting door handle assembly.

FIG. 4 shows components of an angle-detecting door handle assembly 400. The assembly has a magnet 402. For example, this can be an elongate or circular magnet. The magnet will be attached to or otherwise coupled with a shaft 404. For example, this shaft can be part of a four-bar link that controls the movement of a door handle. in some implementations, the magnet is attached to the shaft by way of a carrier 406. For example, the carrier can be fitted onto an end of the shaft and the magnet can be inserted into a cavity on the carrier so as to be held in a particular orientation relative to the shaft.

The assembly includes a rotary sensor 408 that can detect the angle of the magnet, and thereby the angle of the shaft, relative to the sensor. For example, the sensor can be a Hall sensor or any other rotary encoder. The rotary sensor is here connected to an integrated circuit (IC) 410. For example, the IC is programmed according to the type of detection that the assembly is intended to perform.

The IC 410 has legs 412 by which it receives power and sends signals corresponding to the detected angle. The legs facilitate mounting of the sensor onto some structure, here a printed circuit board (PCB) 414. For example, the legs can be soldered onto corresponding leads or other connectors of the PCB. The PCB can also have first terminals 416 for connection to an external multi-cable harness, and second terminals 418 that lead to one or more other parts of the door handle assembly. For example, terminals 418A can be dedicated for supplying a motor of the movable door handle, and terminals 418B can be dedicated to one or more other door handle components (e.g., a lighting unit). That is, each of the terminals 418 can be connected with one or more of the terminals 416 by way of pass-through interconnects on the PCB. As such, the PCB can not only form the mounting structure for the sensor circuitry, but can also serve as a breakout for the wiring for the motor and another component (e.g., an LED unit). This can provide the advantage of simplified installation and eliminating the need for additional inline connectors for these components.

The assembly has an at least partially hollow housing 420 that is intended to accommodate the sensor components and the PCB. In some implementations, the housing on one of its sides has a cavity 420A to accommodate the terminals 416, and on an opposite side has respective cavities 420B-C to accommodate the respective terminals 418. The housing can also provide an arm 422 for housing the sensor and the IC. For example, the housing can be made from a plastic material, such as by way of injection molding.

In the assembly process, the sensor 408 and the IC 410 can be attached to the PCB 414 by way of the legs 412. Next, the PCB-sensor assembly can be installed inside the housing 420 such that the sensor extends within the arm 422. Next, an overmold 424 can be created between the inside of the housing and the PCB-sensor assembly. For example, this can fixate the circuitry inside the housing and protect it from mechanical damage.

Figure 5:
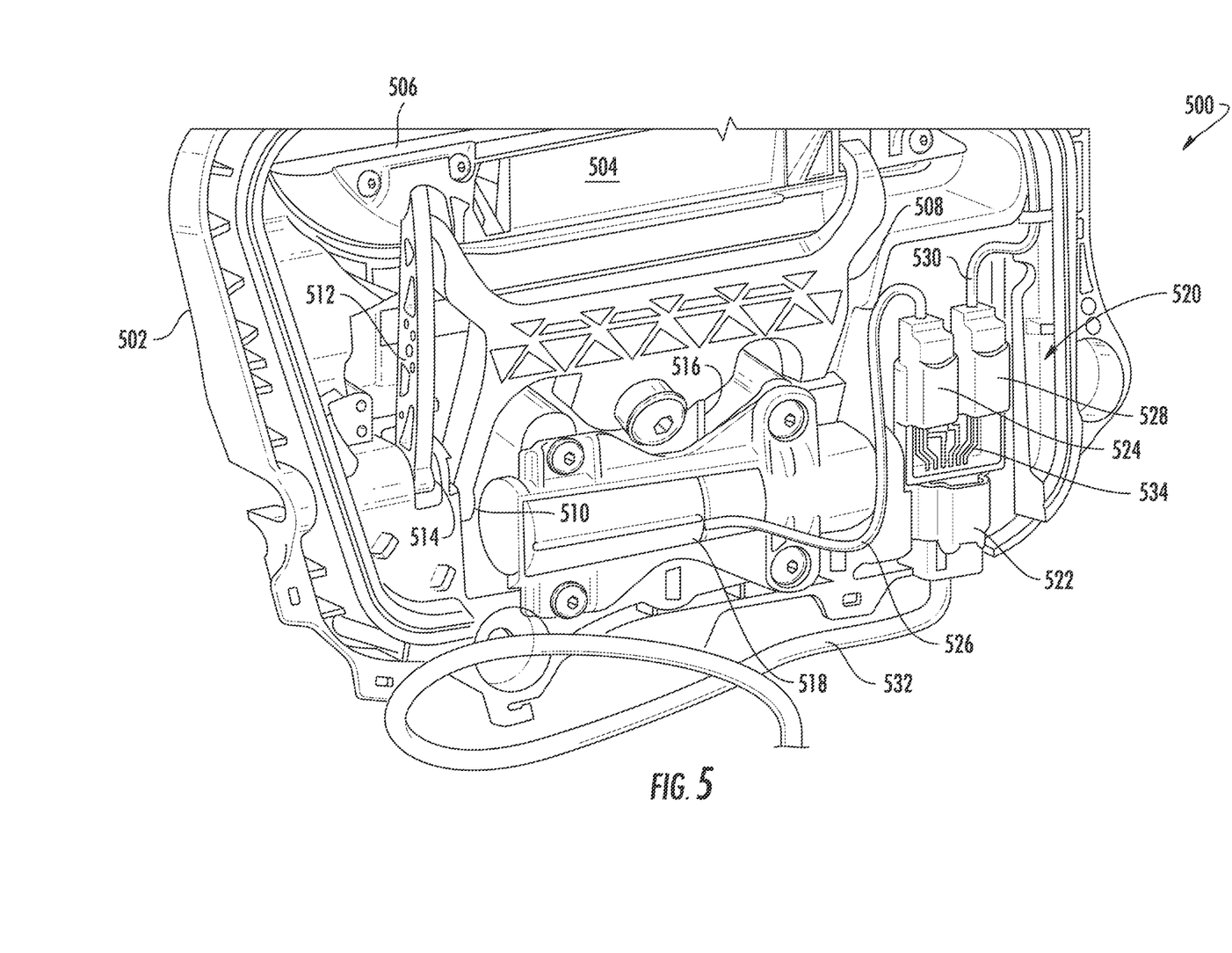
FIG. 5 shows another example of an angle-detecting door handle assembly.

FIG. 5 shows another example of an angle-detecting door handle assembly 500. The assembly includes a door handle tray 502, a handle base member 504, handle posts 506, a swing arm 508, a shaft 510, a control arm 512, a shaft 514, a spring 516, a motor 518, a sensor assembly 520, a harness cavity 522, a motor wire cavity 524, a motor wire 526, an LED wire cavity 5283 and an LED wire 530. A multi-connector harness 532 is currently attached to the harness cavity 522 A lead frame 534 is here shown as part of the sensor assembly 520. A part of the housing for the sensor assembly has here been removed for clarity, but in normal use the lead frame can be covered by the housing. The lead frame serves to couple various connectors or terminals to each other.

In some implementations, the mufti-connector harness 532 leads to a bus and from there to one or more other components in the vehicle, including, but not limited to, a door handle controller and a body controller. For example, the door handle controller 140 and body controller 142 in FIG. 1 can be used.

In some implementations, the door handle controller can monitor the angle that is continuously detected by the sensor assembly, and can give the motor instructions to stop or start based at least in part on that sensor signal. When it is determined that a person pulls the handle in the presented position, the door handle controller can send a signal to the body controller to open the door. The body controller, in turn, can send a command to a door latch to unlatch the door. The door handle controller, moreover, can cause the motor to clamp the handle into the fully extended (e.g., 100%) position so as to prevent rattling during door opening. When the door is ajar or closed, the handle can move back to presented position so it can be pulled again. For example, when the door is closed the door controller can instruct the door handle controller to bring the handle back to the presented position. Upon the occurrence of another event, such as the vehicle being placed into drive mode or the expiration of a countdown timer, the door handle controller can actuate the motor to fully retract the handle(s) into the door(s).

One advantage of a door handle system based on sensing of rotational angle is that it can provide increased flexibility to the installation. In some implementations, operational aspects such as the position of the grip at various stages (e.g., retracted, presented, clamped) can then be modified at a future point in time by way of reprogramming the door handle controller. This can be done by way of a firmware update, such as to change (or delete or create) one or more of the threshold angles in the graph 300 of FIG. 3. For example, a different angle can correspond to the presented position of the handle member, a different angle can correspond to the retracted position of the handle member, and/or a different angle can correspond to a clamped position of the handle member.

Figure 6:
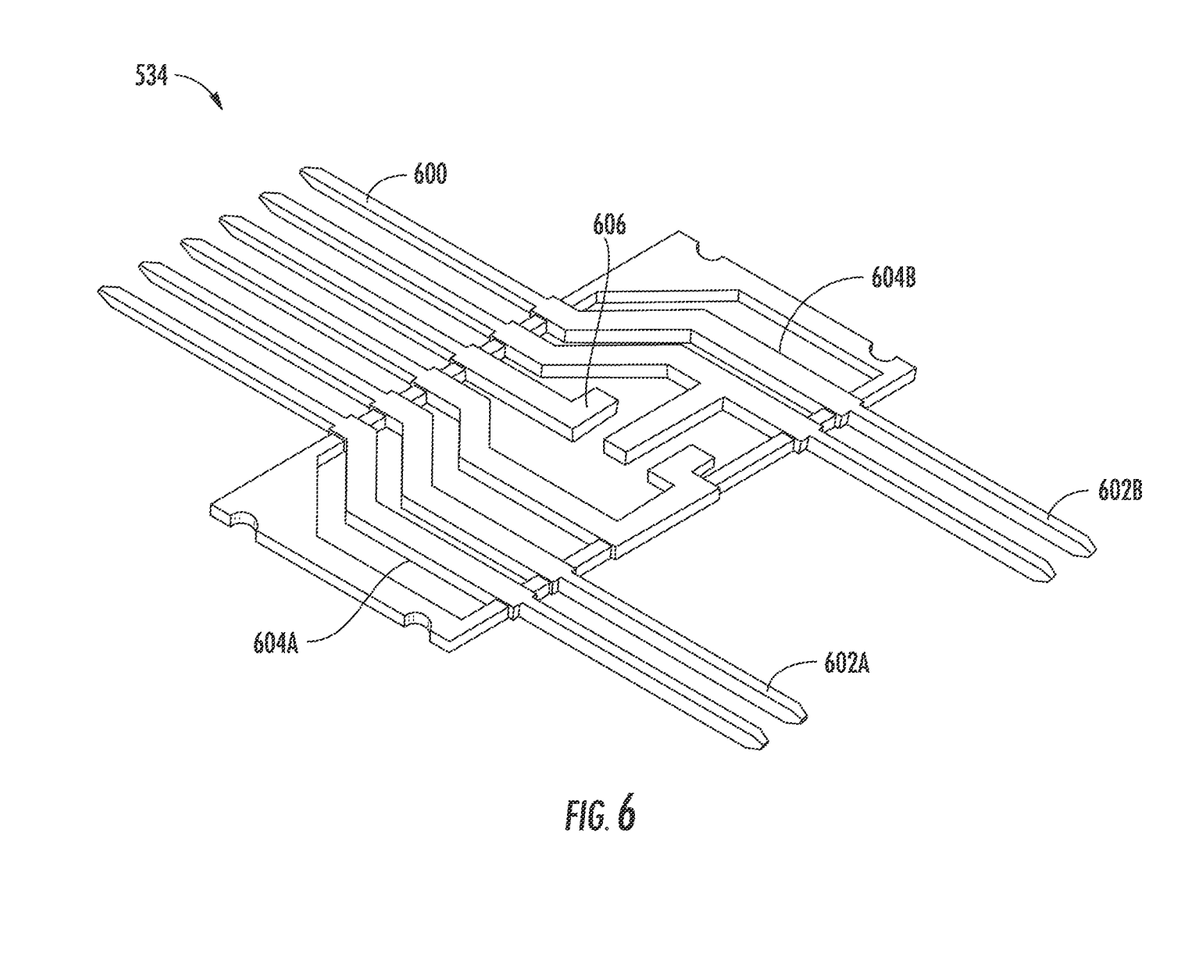
FIG. 6 shows an example of the lead frame of FIG. 5.

FIG. 6 shows an example of the lead frame 534 of FIG. 5. The lead frame has terminals 600 at one end, and terminals 602 at the other end. For example, the terminals 600 can lead to and from a harness that is the sole connection from the handle assembly to the rest of the vehicle. The terminals 602A can lead to the wiring for an electric motor in the door handle, and the terminals 602B can lead to a lighting element, such as an LED The lead frame serves as a breakout for the connection between, on the one hand, the harness to the vehicle, and on the other, the motor/LED wiring. As such: the lead frame can have pass through leads 604A for the motor, and pass through leads 604B for the lighting or other component. Terminals 606 allow connections to be made to the sensor circuitry from the vehicle harness.

Figure 7:
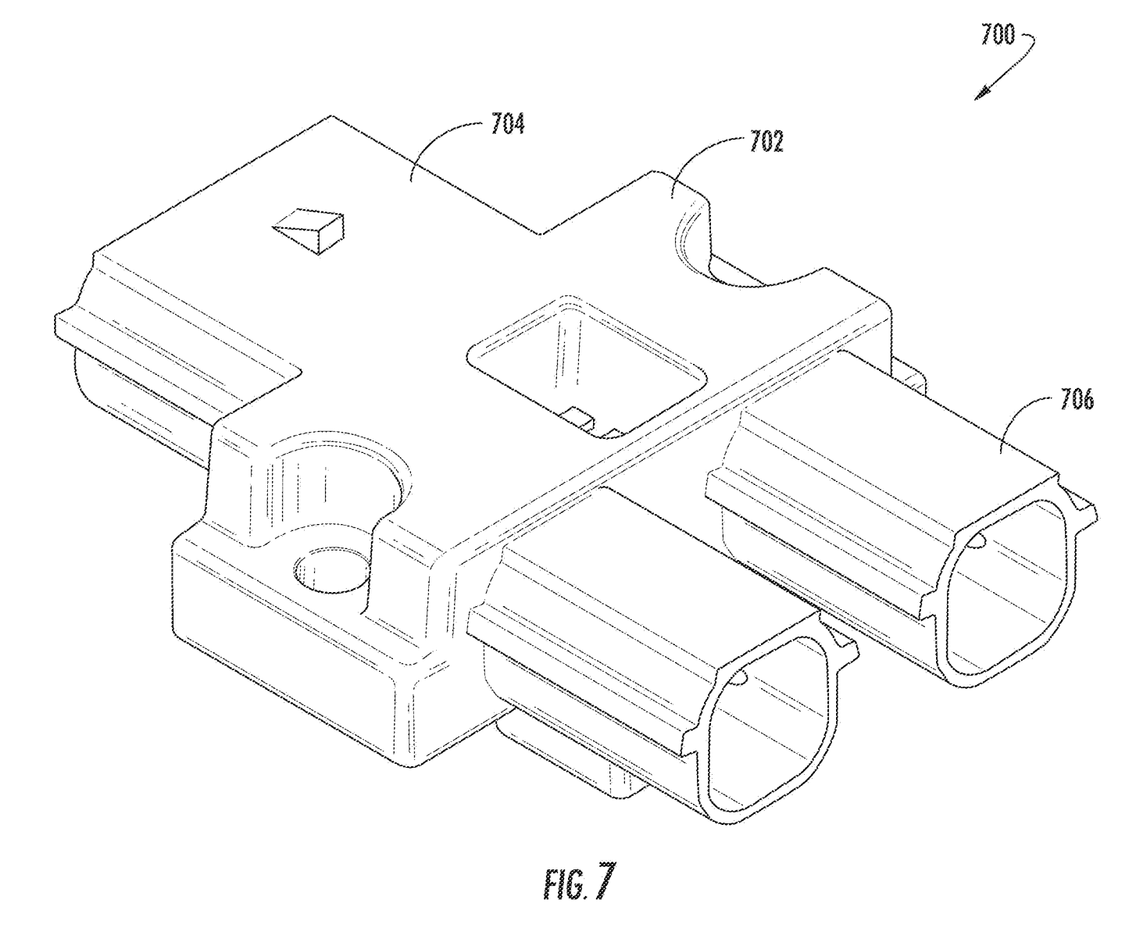
FIG. 7 shows an example of a housing that can be used for a rotary sensor.

FIG. 7 shows an example of a housing 700 that can be used for a rotary sensor. In some implementations, the housing can be used with a lead frame that serves to both couple sensor circuitry to a vehicle harness and to act as a breakout for signals to one or more other components in the door handle assembly. The housing includes a body 702 that is configured to hold the sensor circuitry (e.g., a rotary sensor and its associated IC), as well as a lead structure, such as a PCB or a lead frame. On the body are provided a cavity 704 on one end, and parallel cavities 706 at another end. For example, these can accommodate couplings for a vehicle harness and internal components, respectively. The housing can be made from an injection molded plastic material, to name just one example.

Figure 8:
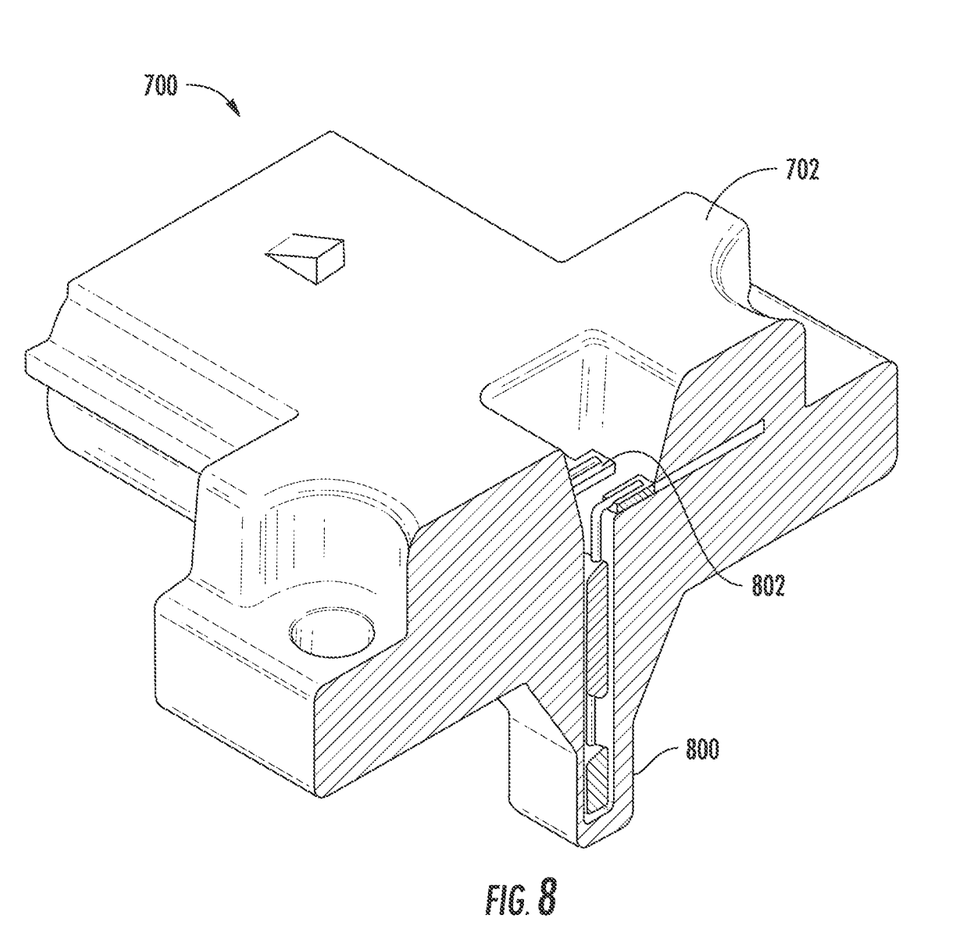
FIG. 8 shows a cross section of the housing in FIG. 7.

FIG. 8 shows a cross section of the housing 700 in FIG. 7. Here, the body 702 has an arm 800 that accommodates at least part of the sensor circuitry. For example, the arm can allow the sensor to be positioned on an opposite side of a door handle tray than the rest of the sensor assembly. Terminals 802 can be used for making connections with respective legs of the sensor IC. For example, this can be similar to the terminals 606 in FIG. 6.

Figure 9:
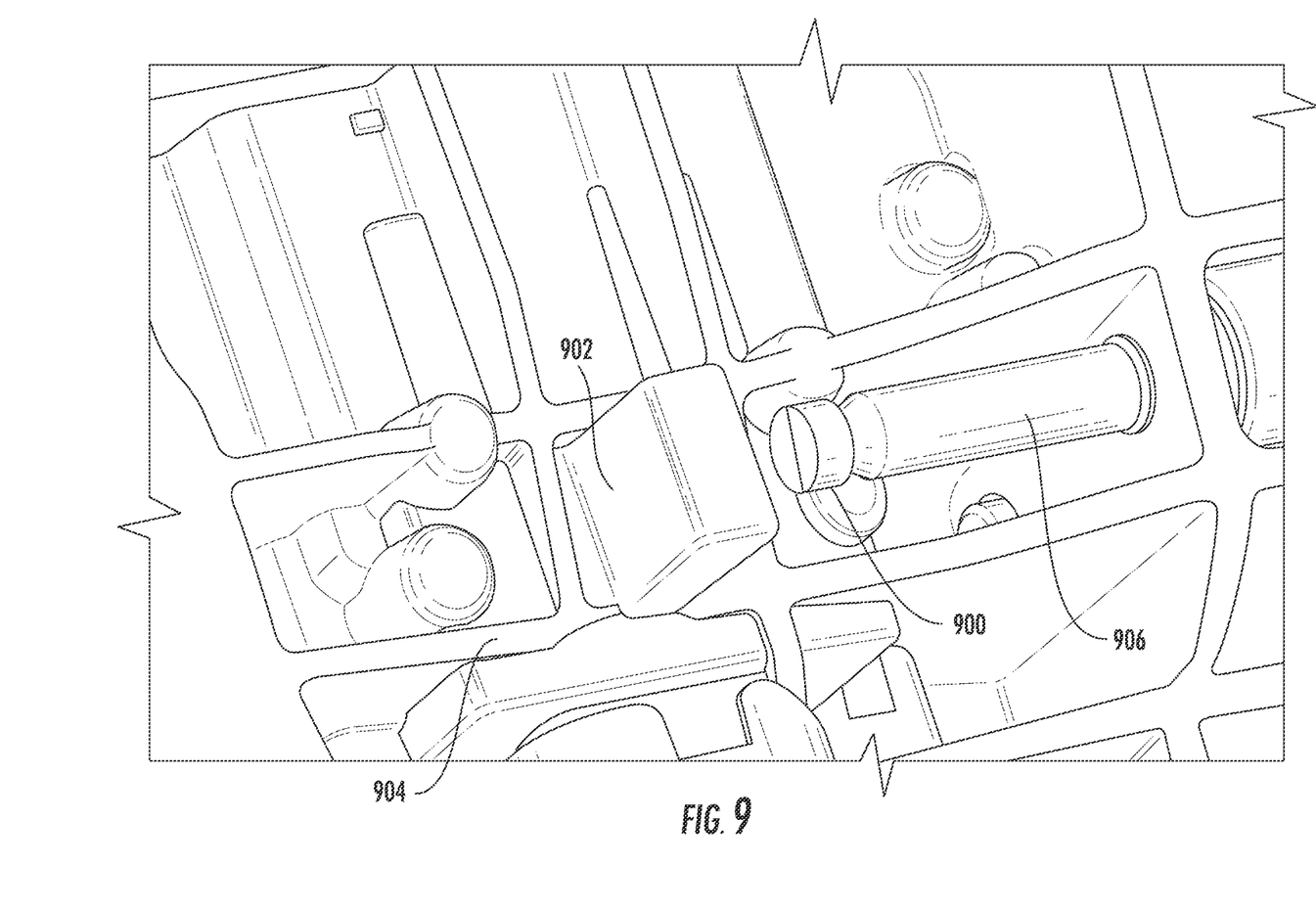
FIG. 9 shows an example of a rotary sensor and a magnet.

FIG. 9 shows an example of a rotary sensor and a magnet 900. The rotary sensor is here enclosed in a housing 902. In some implementations, this enclosure is part of a housing for the entire sensor assembly, to facilitate that the rotary sensor is positioned correctly relative to the magnet. For example, the housing can extend through an opening in a door handle tray 904.

The magnet is mounted on a shaft 906. In some implementations, the shaft is arranged so as to be rotatable relative to the door handle tray when a door handle is being moved by a motor. For example, the shaft can be part of a four-bar link. The respective poles of the magnet can be detected by the sensor, which thereby determines the angle of rotation of the shaft. For example, the rotary sensor can be a Hall sensor or a magnetoresistive sensor and can be configured for continuously sensing the shaft angle, both for purposes of controlling handle position and for detecting user inputs made by pushing or pulling on the handle. The spacing between the sensor and the magnet can be selected to obtain a sensor signal of sufficient quality.

FIGS. 10-13 show examples of adjusting a housing 1000 relative to a carrier 1002 of an angle-detecting door handle assembly. The housing can be used with any or all sensor assemblies described herein. In some implementations, the carrier is part of respective ones of the door handle assemblies described herein. For example, the carrier can be similar or identical to the door handle tray 102 (FIG. 1).

Figure 10:
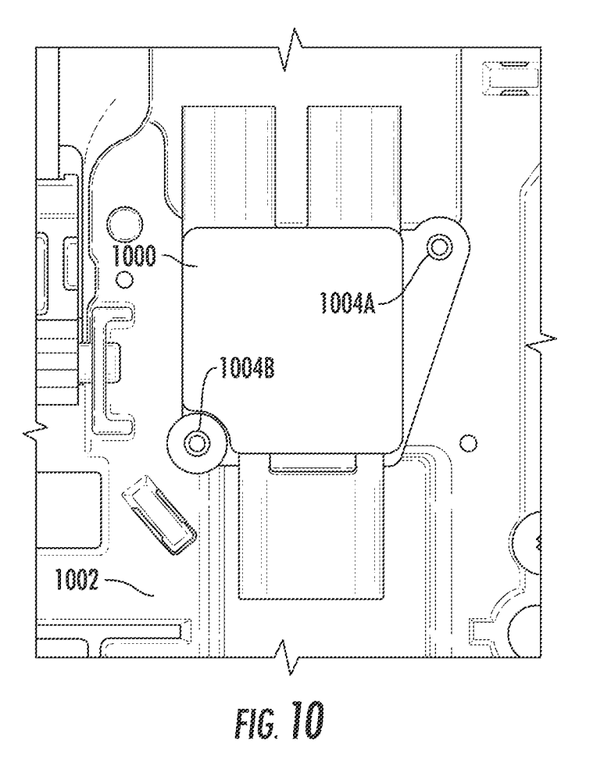
FIGS. 10-13 show examples of adjusting a housing relative to a carrier of an angle-detecting door handle assembly.

It has been mentioned earlier that it can be useful to ensure a particular spacing (or a spacing within a specified range) between a rotary sensor and the object (e.g., a magnet) that it detects. For example, a rotary sensor, such as a Hall sensor, works best when there is a particular air gap between the sensor and the magnet. However, the tolerances that are designed into the dimensions of all relative components (e.g., the sensor, the sensor housing, the magnet, the magnet mount, the shaft and the carrier) can in some circumstances stack up so that the intended sensor-magnet air gap becomes larger or smaller than intended. Generally, the magnet field can be detected from a greater distance if a stronger magnet is used, but this can have unwanted consequences regarding cost, assembly size and possible interference. The housing 1000, on the other hand, is an example of how adjustability can be provided such that the magnet need not be oversized in regards to the requirements of the system.

Figure 11:
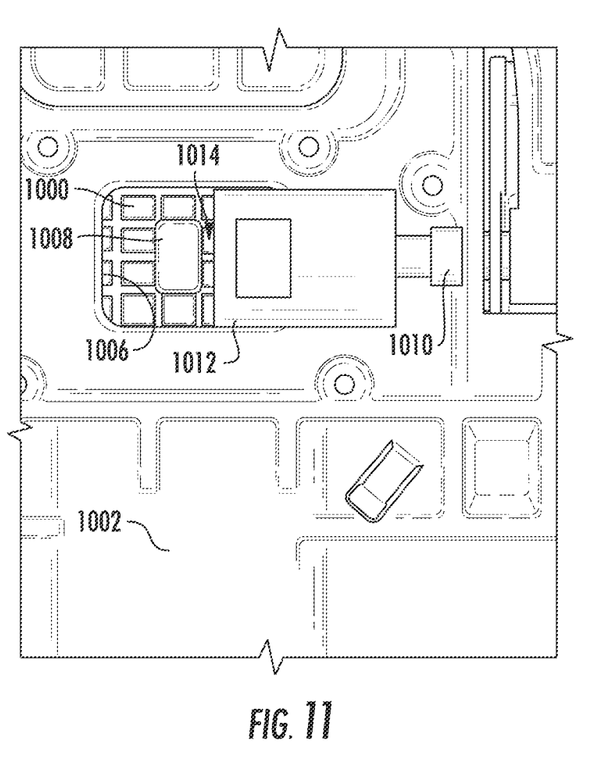

The housing has openings 1004A-B for attaching the housing to the carrier. For example, a fastener such as a bolt can be used. FIG. 11 shows the other side of the carrier 1002 such that the housing 1000 is only partially visible through an opening 1006. The sensor is positioned in an arm 1008 of the housing that extends through the opening 1006.

A shaft 1010 is part of the door handle assembly. For example, the shaft can be part of a four-bar link that is designed to make the door handle movable between at least retracted and presented positions. A magnet carrier 1012 with a magnet is mounted on the shaft 1010 so that a gap 1014 is formed between the carrier and the housing of the sensor.

Figure 12:
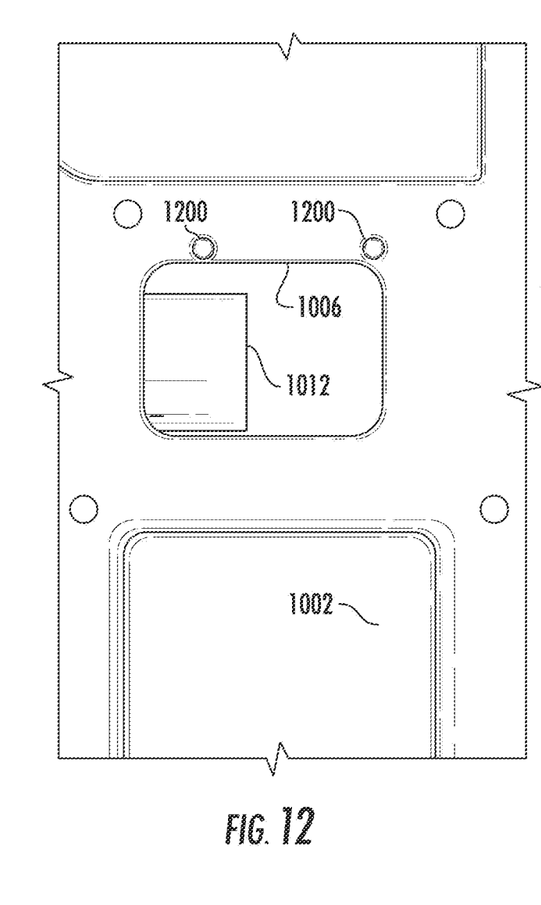
Figure 13:
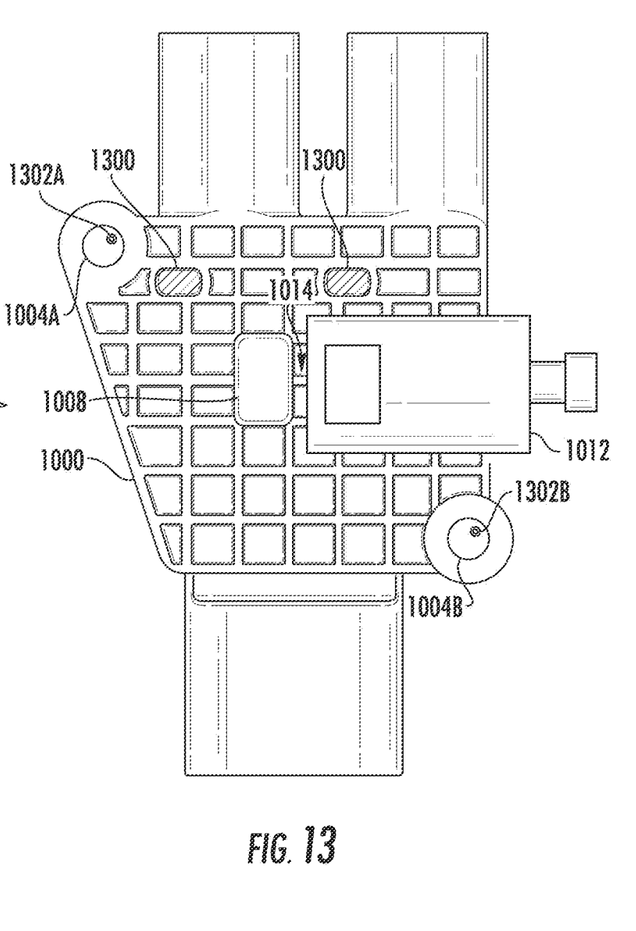

FIG. 12 shows that the carrier 1002 can have one or more datum features 1200, which can be a projection, protrusion, raised feature, boss, or the like, extending from a surface of the carrier. In some implementations, the datum features are arranged in a particular orientation that corresponds to the dimension in which the sensor assembly should be adjustable. For example, the features can be aligned horizontally. FIG. 13, moreover, shows that the housing 1000 can have one or more elongate slots 1300. In some implementations, the slot(s) can be integrated among ribs or other features that already make up the structure of the housing. For example, the slots can be created in a process where the housing is molded to a particular form. Here, the slots are aligned with each other according to the locations of the datum features.

The slot(s) 1300 can cooperate with the datum feature(s) 1200 to facilitate adjustment of the housing relative to the carrier. For example, the housing can be manually slid in either direction (i.e., as restricted by the one or more datum features and corresponding elongate slot) until the air gap 1014 has a specified size. The openings 1004A-B, moreover, can be oversized relative to the respective locations 1302A-B on the carrier where the fasteners should attach. As such, the oversized openings can facilitate reliable securing of the housing to the carrier in various positions, which enables a flexible control of the dimensions of the air gap.

The above example involves two datum features and two corresponding elongate slots. In other implementations, more or fewer pairs can be used. Also, the respective positions can be the opposite so that the datum feature(s) can be on the housing and the elongate slot(s) can be on the carrier.

A number of implementations have been described as examples. Nevertheless, other implementations are covered by the following claims.

What is claimed is:

1. An angle-detecting door handle assembly comprising:
 a carrier including a projection;
 a handle member;
 a four-bar link pivotally connected to the handle member and configured to move the handle member between at least a retracted position and a presented position relative to a door surface, the four-bar link comprising a shaft configured to attach the four-bar link to the carrier;
a motor configured to actuate the four-bar link;
a rotary sensor assembly configured to detect an angle of the four-bar link throughout actuation and generate a signal corresponding to the detected angle, the rotary sensor assembly comprising:
 a housing connected to the carrier, the housing including one or more oversized fastener openings to allow attachment of the housing to the carrier that accommodates adjustment between the housing and the carrier;
 a magnet connected to the shaft; and
 a non-contact rotary sensor located at least partially in the housing in a location near the magnet such that the non-contact rotary sensor can detect rotation of the magnet; and
a controller configured to control the motor based on the signal from the rotary sensor assembly;
wherein the housing comprises a slot, and the slot is configured to interface with the projection to allow the housing to be adjustable in a single dimension relative to the carrier to change a gap between the magnet and the non-contact rotary sensor disposed in the housing.

2. The angle-detecting door handle assembly of claim 1, wherein the non-contact rotary sensor detects orientation of poles of the magnet.

3. The angle-detecting door handle assembly of claim 1, wherein the shaft comprises an axis and the single dimension is parallel to the axis.

4. The angle-detecting door handle assembly of claim 1, wherein the non-contact rotary sensor comprises a Hall sensor or a magnetoresistive sensor.

5. The angle-detecting door handle assembly of claim 1, wherein the controller is configured to stop the motor from actuating the four-bar link upon detecting that the motor actuates the shaft of the four-bar link to a specific angle.

6. The angle-detecting door handle assembly of claim 1, wherein the controller is configured to start or stop the motor upon detecting user actuation of the four-bar link by touching the handle member.

7. The angle-detecting door handle assembly of claim 1, further comprising a biasing member acting on the four-bar link to bring the handle member to the retracted position, wherein the motor actuates the four-bar link against bias of the biasing member to bring the handle member to the presented position.

8. The angle-detecting door handle assembly of claim 1, wherein the rotary sensor assembly is a sole connector for the angle-detecting door handle assembly.

9. The angle-detecting door handle assembly of claim 1, wherein the rotary sensor assembly comprises a lead frame.

10. The angle-detecting door handle assembly of claim 1, wherein the rotary sensor assembly is configured to detect a rotary position of the shaft at all times.

11. A method performed with regard to an angle-detecting door handle assembly, the method comprising:
causing actuation of a four-bar link by a motor, the four-bar link connected to a handle member of the angle-detecting door handle assembly, the handle member initially in a retracted position relative to a door surface;
detecting an angle of the four-bar link throughout the actuation; and
when the detected angle corresponds to a presented position of the handle member, stopping the actuation of the four-bar link;
wherein the four-bar link comprises a swing arm and a control arm, the swing arm pivoting about a shaft relative to the door surface, wherein the angle is detected by rotation of the shaft;
wherein the angle-detecting door handle assembly comprises a magnet and a rotary sensor assembly, wherein the rotary sensor assembly is mounted to a carrier of the angle-detecting door handle assembly, and the magnet is mounted to the shaft;
wherein the carrier comprises a raised feature configured to interface with a slot, and the raised feature and the slot allow the rotary sensor assembly to be adjustable in a single dimension relative to the carrier to change a gap between the magnet and the rotary sensor assembly; and
wherein a housing is connected to the carrier, the housing including one or more oversized fastener openings to allow attachment of the housing to the carrier that accommodates adjustment between the housing and the carrier, and the housing including the slot.

12. The method of claim 11, further comprising, in the presented position, detecting a change in the angle indicating user actuation of the four-bar link by pulling of the handle member, and, in response to the detected change, actuating the four-bar link to advance the handle member to a clamped position.

13. The method of claim 11, further comprising reprogramming the angle-detecting door handle assembly so that a different angle corresponds to the presented position of the handle member.

14. The method of claim 13, further comprising also reprogramming the angle-detecting door handle assembly to change an angle corresponding to the retracted position of the handle member, or to change an angle corresponding to a clamped position of the handle member.

15. A method implemented by a controller included in a vehicle, the method comprising:
monitoring a signal, from a rotary sensor assembly, reflecting a present angle of a four-bar link, the four-bar link connected to a handle of a door handle assembly, the four-bar link being configured to move the handle of the vehicle between at least retracted and presented positions relative to a door surface of the vehicle, the present angle being indicative of a position of the handle, and the signal being updated based on actuation of the four-bar link;
wherein the door handle assembly comprises a magnet and a rotary sensor assembly, wherein the rotary sensor assembly is mounted to a carrier of the door handle assembly, and the magnet is mounted to a shaft of the four-bar link;
wherein the carrier comprises a projection configured to interface with a slot, and the projection and the slot are configured to allow the rotary sensor assembly to be adjustable in a single dimension relative to the carrier to change a gap between the magnet and the rotary sensor assembly;
wherein a housing is connected to the carrier, the housing including one or more oversized fastener openings to allow attachment of the housing to the carrier that accommodates adjustment between the housing and the carrier, and the housing including the slot;
detecting actuation of the four-bar link;

causing, via control of a motor, actuation of the four-bar link based on the detected actuation to move the handle to a predetermined position; and monitoring the position of the handle during actuation based on the signal.

16. The method of claim 15, wherein the four-bar link is actuated via the motor or via user actuation of the handle.

* * * * *